US012205112B2

(12) United States Patent
Sarkissian et al.

(10) Patent No.: US 12,205,112 B2
(45) Date of Patent: *Jan. 21, 2025

(54) EMBEDDED DATA TRANSACTION EXCHANGE PLATFORM

(71) Applicant: TBOL, Inc., Surprise, AZ (US)

(72) Inventors: Shaunt M. Sarkissian, Reno, NV (US); William Dennings, Surprise, AZ (US); Anthony Watson, Surprise, AZ (US)

(73) Assignee: TBOL, Inc., Surprise, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,449

(22) Filed: Oct. 16, 2023

(65) Prior Publication Data

US 2024/0095734 A1 Mar. 21, 2024

Related U.S. Application Data

(63) Continuation of application No. 17/014,943, filed on Sep. 8, 2020, now Pat. No. 11,854,005.
(Continued)

(51) Int. Cl.
*G06Q 20/38* (2012.01)
*G06F 16/27* (2019.01)

(52) U.S. Cl.
CPC ........... *G06Q 20/389* (2013.01); *G06F 16/27* (2019.01)

(58) Field of Classification Search
USPC .......................................................... 705/44
See application file for complete search history.

(56) References Cited

U.S. PATENT DOCUMENTS 11,062,042 B1 * 7/2021 McKervey ............ G06F 16/137
11,093,936 B2 8/2021 Dill et al.
(Continued)

FOREIGN PATENT DOCUMENTS

CN 108027939 A * 5/2018 ............. G06Q 20/08
RU 2571733 C2 * 12/2015 ............ G06Q 20/305
(Continued)

OTHER PUBLICATIONS

Title: Enterprise content and search management for building digital platforms Author: Shivakumar, Shailesh Kumar Published by John Wiley & Sons, Inc. (Year: 2017).*
(Continued)

*Primary Examiner* — Christopher Bridges
*Assistant Examiner* — Yongsik Park
(74) *Attorney, Agent, or Firm* — K&L Gates LLP

(57) ABSTRACT

Aspects of the present disclosure are presented for an Embedded Data Transaction Exchange Platform (EDT-X) that generates marker data about relevant data of a transaction, and reliably stores the marker data in a permanent data storage, such as a block chain distributed ledger. The EDT-X platform does not generate the actual information that explains who was involved in the transaction or what the contents of the transaction were, but rather generates marker data that can reliably lead to tracing back to that information. The marker data may be permanently stored in a permanent data storage entity, such as a block chain distributed ledger. The data about the content of the transaction may be anonymously stored in a secure database, and the marker data pointing to the content of the transaction may be retrieved from the block chain distributed ledger to look up where the content data is stored in the secure database.

19 Claims, 6 Drawing Sheets

Related U.S. Application Data

(60) Provisional application No. 62/897,387, filed on Sep. 9, 2019.

(56) References Cited

U.S. PATENT DOCUMENTS

| | | | |
|---|---|---|---|
| 11,423,385 B2 | 8/2022 | Ibasco et al. | |
| 2003/0131027 A1* | 7/2003 | Holenstein | G06F 16/273 |
| 2008/0163379 A1* | 7/2008 | Robinson | G06F 3/04815 |
| | | | 715/738 |
| 2013/0262315 A1 | 10/2013 | Hruska | |
| 2014/0279475 A1 | 9/2014 | Castrechini et al. | |
| 2015/0032627 A1 | 1/2015 | Dill et al. | |
| 2015/0112790 A1 | 4/2015 | Nolinsky et al. | |
| 2015/0269569 A1 | 9/2015 | Sarkissian et al. | |
| 2015/0310419 A1 | 10/2015 | Kadaster et al. | |
| 2015/0363808 A1 | 12/2015 | Maggio | |
| 2016/0055322 A1* | 2/2016 | Thomas | H04L 63/0876 |
| | | | 726/7 |
| 2017/0031963 A1 | 2/2017 | Mertz et al. | |
| 2017/0232300 A1* | 8/2017 | Tran | G06F 1/163 |
| | | | 434/247 |
| 2019/0229890 A1* | 7/2019 | Brehmer | H04L 9/088 |
| 2019/0243572 A1* | 8/2019 | Kursun | H04L 9/50 |
| 2019/0244306 A1* | 8/2019 | Kursun | G06F 16/137 |
| 2020/0226233 A1* | 7/2020 | Penugonda | H04L 9/3239 |
| 2021/0390161 A1* | 12/2021 | Nakadaira | G06F 21/105 |

FOREIGN PATENT DOCUMENTS

| | | | | |
|---|---|---|---|---|
| RU | 2669081 C2 * | 10/2018 | | G06Q 20/385 |
| WO | WO-2017098288 A2 * | 6/2017 | | |
| WO | WO-2019186156 A1 * | 10/2019 | | |

OTHER PUBLICATIONS

Tien Tuan Ahn Dinh et al.; "Untangling Blockchain: A Data Processing View of Blockchain Systems", Aug. 2017.

* cited by examiner

EMBEDDED DATA TRANSACTION EXCHANGE PLATFORM

CROSS-REFERENCE TO RELATED APPLICATIONS

This application is a continuation of U.S. patent application Ser. No. 17/014,943, filed Sep. 8, 2020, titled "EMBEDDED DATA TRANSACTION EXCHANGE PLATFORM", which claims priority to U.S. Provisional Application 62/897,387, filed Sep. 9, 2019, and titled "Embedded Data Transaction Exchange Platform," the disclosure of which is hereby incorporated herein in its entirety and for all purposes.

TECHNICAL FIELD

The subject matter disclosed herein generally relates to processing data. In some example embodiments, the present disclosures relate to systems and methods for providing an embedded data transaction exchange platform.

BRIEF SUMMARY

Aspects of the present disclosure are presented for an Embedded Data Transaction Exchange Platform (EDT-X) that generates marker data about relevant data of a transaction, such as a financial transaction, and reliably stores the marker data in a permanent data storage, such as a block chain distributed ledger, including a hyperledger or other type of distributed ledger system. The EDT-X platform does not generate the actual information that explains who was involved in the transaction or what the contents of the transaction were, but rather generates marker data that can reliably lead to tracing back to that information. The marker data may be permanently stored in a permanent data storage entity, such as a block chain distributed ledger. The block chain distributed ledger may be quasi-private, in that it would normally be kept private but access can be given to auditors and other regulatory bodies. In this way, the actual transaction information may still be stored in an encoded fashion in a secure database and in an anonymous fashion, but auditing to find and decipher that transaction data may be easily achieved through the access of the block chain distributed ledger that is independently reliable. Furthermore, because the markers that lead to the encoded information will be permanently stored, reviewers are provided assurances through the present disclosures that an audit of the information is not doctored or tampered with.

In some aspects, an embedded Data Transaction Exchange (EDT-X) Platform for storing marker data that references content about a transaction is presented. The EDT-X platform may include: a block chain distributed ledger manager interface; a data marker identification database; a data management gateway; an administration platform; and a user interface. The EDT-X engine may be configured to: access a block chain distributed ledger; receive data from a user through the user interface; generate marker data to be associated with the received data, wherein the marker data provides a unique reference to the received data; and store the marker data along with the received data in the block chain distributed ledger such that the marker data and the received data cannot be altered once stored in the block chain distributed ledger. The received data may be stored secretly such that only authorized users may be able to view the received data in the block chain distributed ledger, while the associate marker data may be viewed publicly.

In some aspects of the the EDT-X platform, the marker data incudes a marker definition portion and a marker ID portion, wherein the marker definition portion comprises information that is searchable to allow the marker data to be retrieved within the block chain distributed ledger, and the marker ID comprises non-searchable information that was provided by the user through the user interface.

In some aspects of the the EDT-X platform, the marker definition portion comprises: a first data field for a marker type representing a type of data source; a second data field for a location from where the received data was entered into the block chain distributed ledger; and a third data field for a classification representing what type of subject matter does the received data pertain to.

In some aspects of the the EDT-X platform, the marker definition portion further comprises a fourth data field for licensing data associated with the received data.

In some aspects of the the EDT-X platform, the platform is further configured to: subdivide the received data into a plurality of data portions, each delineated by a different data source from where each data portion of the plurality of data portions originated from; for each of the plurality of data portions: generate a unique data marker; and store the data portion and associated unique data marker in the block chain distributed ledger separately from the other data portions and associated unique data markers. An audit of a combination of all of the plurality of data portions may be necessary to review a single financial transaction.

In some aspects, a method for storing marker data that references content about a transaction in a block chain distributed ledger, is presented. The method may include: initiating a transaction; generating one or more data sources associated with the transaction, the one or more data sources comprising content that describes a type of transaction or the contents of the transaction; initiating a request to an embedded data transaction exchange (EDT-X) platform to generate marker data for each of the one or more data sources, the marker data representing pointers to the content of the data source that describes the type of transaction or the contents of the transaction; storing, in a secure database, the content of the data source anonymously, such that the secure database lacks context to link the content of the data source to the data source if the marker data is not referenced; and storing the marker data in a block chain distributed ledger.

In some aspects of the method, the marker data comprises a marker definition portion and a marker ID portion, wherein the marker definition portion comprises information that is searchable to allow the marker data to be retrieved within the block chain distributed ledger, and the marker ID comprises non-searchable information that was provided by the user through the user interface.

In some aspects of the method, the marker definition portion comprises: a first data field for a marker type representing a type of data source; a second data field for a location from where the received data was entered into the block chain distributed ledger; and a third data field for a classification representing what type of subject matter does the received data pertain to.

In some aspects of the method, the marker definition portion further comprises a fourth data field for licensing data associated with the received data.

In some aspects of the method, the method may further include: subdividing the received data into a plurality of data portions, each delineated by a different data source from where each data portion of the plurality of data portions originated from; for each of the plurality of data portions: generating a unique data marker; and storing the data portion and associated unique data marker in the block chain distributed ledger separately from the other data portions and associated unique data markers. An audit of a combination of all of the plurality of data portions may be necessary to review a single financial transaction.

BRIEF DESCRIPTION OF THE DRAWINGS

Some embodiments are illustrated by way of example and not limitation in the figures of the accompanying drawings.

DETAILED DESCRIPTION

Providing reliable audit information for regulatory bodies and due diligence efforts is increasingly subject to doubt, due to increasingly more sophisticated methods of hacking and tampering of data. Artificial intelligence can be used to create new ways of infiltrating data records, and algorithms may be more easily developed for dynamically creating deep fakes that can impersonate record holders, whether they are machine or human agents. Furthermore, the financial services industry faces a serious challenge with money movement and clearly knowing who is sending and receiving the funds associated with the transaction. Regulations for know your customer (KYC) and know your customer's customer, and the requirements for beneficiary information make the task even more difficult. When the transaction is an international transaction, the regulatory requirements for each country and the number of financial institutions involved in the transaction lifecycle further complicate the task. It is therefore desirable to develop more trustworthy technological means for reliably recording data that can be trusted to trace back to past transactions whenever called upon.

Aspects of the present disclosure are presented for an Embedded Data Transaction Exchange Platform (EDT-X) that generates marker data about relevant data of a transaction, such as a financial transaction, and reliably stores the marker data in a permanent data storage, such as a block chain distributed ledger, examples including a hyperledger, block chain or other type of distributed ledger system. The EDT-X platform does not generate the actual information that explains who was involved in the transaction or what the contents of the transaction were, but rather generates marker data that can reliably lead to tracing back to that information. The marker data may be permanently stored in a permanent data storage entity, such as a block chain distributed ledger. The block chain distributed ledger may be quasi-private, in that it would normally be kept private but access can be given to auditors and other regulatory bodies. In this way, the actual transaction information may still be stored in an encoded fashion in a secure database and in an anonymous fashion, but auditing to find and decipher that transaction data may be easily achieved through the access of the block chain distributed ledger that is independently reliable. Furthermore, because the markers that lead to the encoded information will be permanently stored, reviewers are provided assurances through the present disclosures that an audit of the information is not doctored or tampered with.

Figure 1:
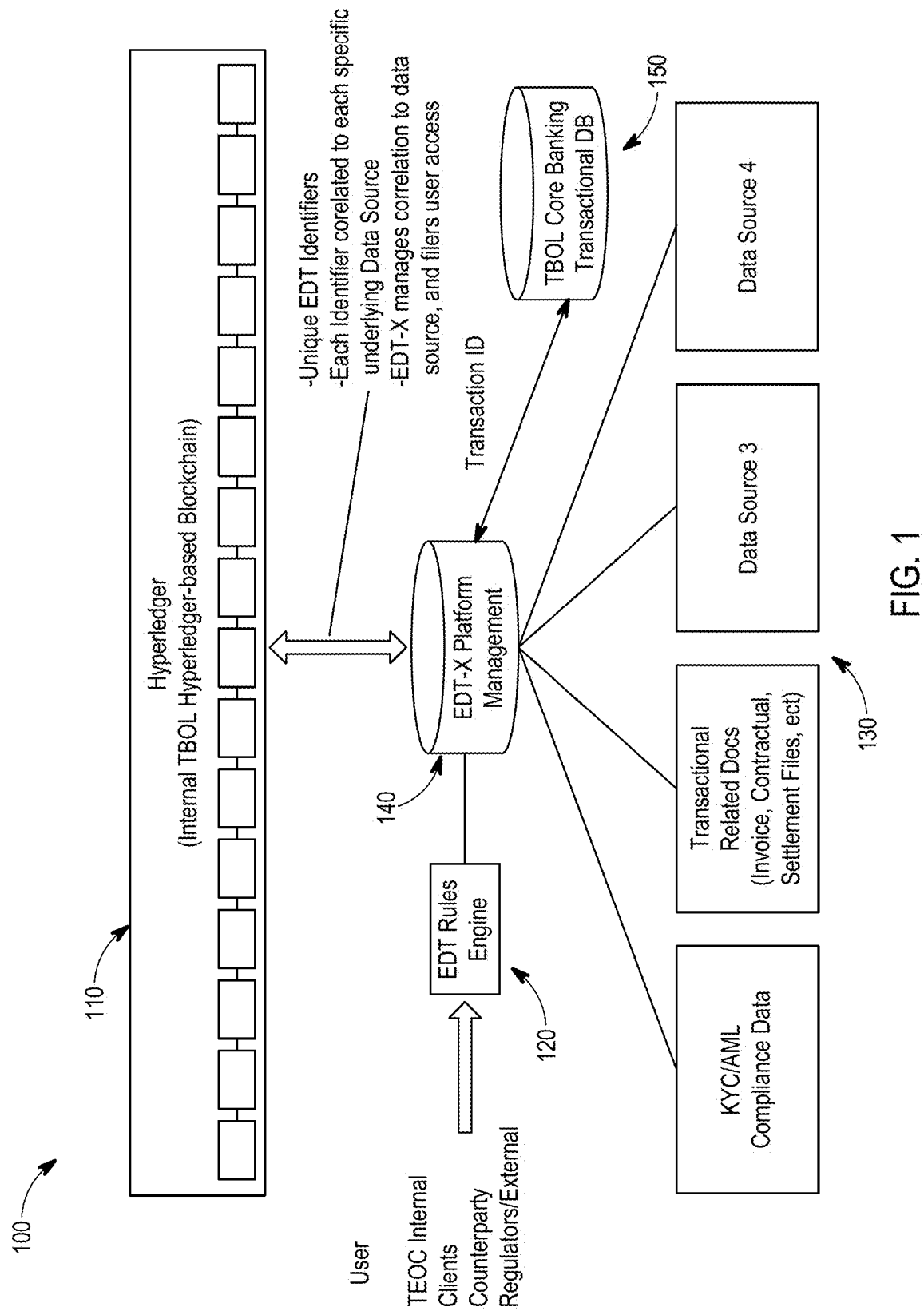
FIG. 1 shows a block diagram of structures at a high level and their interrelationships in the EDT-X platform according to some aspects.

FIG. 1 shows a block diagram 100 of structures at a high level and their interrelationships in the EDT-X platform 140 according to some aspects. For any transaction, such as types of financial transactions, various kinds of data 130 may be desired to be stored and recorded. This can include "know your customer" (KYC) data, transactional related documents, financial records, identifying information about the clients conducting the transactions, dates, and amounts, as just some examples. All of these kinds of information may be desired to be audited in the future, and it may be desirable to ensure they are not tampered with. These kinds of information may be stored in a transactional database 150 in a secure and anonymous fashion, but the EDT-X platform 140 of the present disclosure may also receive this data 130 and generate marker data that points to each of these relevant pieces of data. The marker data may be encoded into a permanent data structure, such as a hyperledger 110. The hyperledger 110 may be one example of a block chain distributed ledger, which generally describes a class of digital ledger systems that are immutable once the data is entered. Bit Coin is another example of a block chain distributed ledger. In general, other kinds of block chain distributed ledgers may be used for the EDT-X, though the hyperledger 110 is the example shown herein. The hyperledger 110 may be a quasi-private distributed ledger that provides trustworthiness that the information stored is not tampered with, even after inspecting the data far into the future. The encoded marker data may be encoded according to an EDT rules engine 120, according to some aspects. The marker data may be tied to the data items in the transactional database, such that when the marker data is decoded off of the hyperledger 110, the user will be able to identify what information in the anonymously stored transactional database belongs to the record they are trying to audit.

Figure 2:
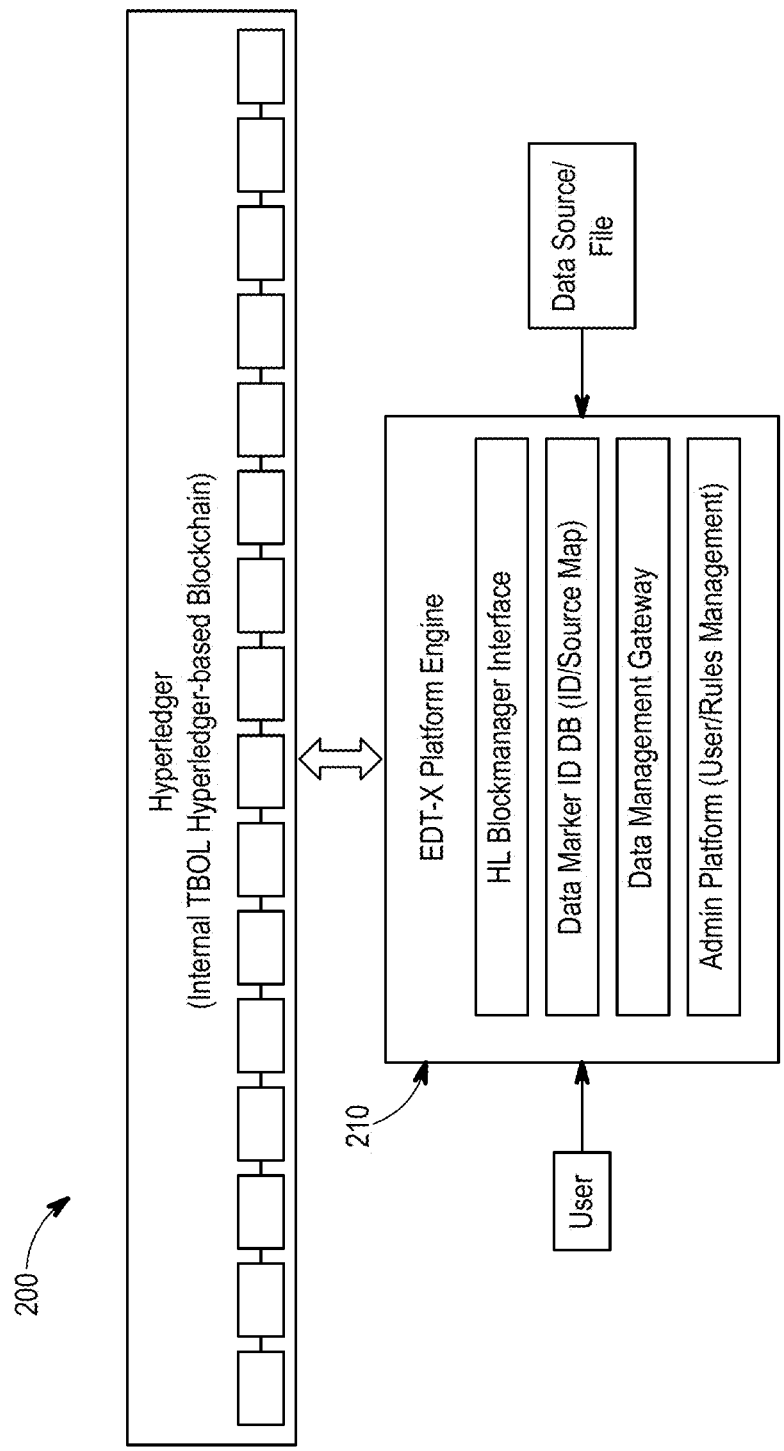
FIG. 2 shows example structures inside the EDT-X platform engine, according to some aspects.

Illustration 200 in FIG. 2 shows example structures inside the EDT-X platform engine 210, according to some aspects. Here, the EDT-X Platform Engine 210 is comprised of four primary central components:

Hyperledger (HL) Blockmanager Interface;
Data Marker ID DB;
Data Management Gateway; and
Admin Platform.

HL Blockmanger Interface:

The primary role of the interface is the management and mapping of the data markers to the Hyperledger Blocks, and related data location points. It adds the data/financial marker IDs to the HL, and manages locations, and related HL data interface/recall process.

Data Marker Identifier (ID) Database (DB)

The Data Marker ID DB acts as the central point for the creation of the Data Marker IDs, stores the IDs, and correlates the Marker ID to the underlying Data Source. It acts as the central router/map of the markers to the underlying data source or financial transactional data.

Data Management Gateway

The Data Management Gateway acts the main connection point and router for all data source and financial transaction data to the EDT/X engine. Allow for both internal and external data sources to connect, as in communicate with the ETD engine—as well as manage all EDT-X data access and data reporting requests.

Admin Platform

The Admin Platform is the main management platform for all users, business rules, compliance, and reporting components of the EDT-X engine. Manages access control for the platform, as well as data filtering to ensure compliance and management of data to related applicable parties.

The following are some examples of how the example structures in the EDT-X platform may perform their transaction processes in order to collect the relevant transactional data and store associated marker data in a hyperledger:

Data Component Addition
1. Data Source accesses EDT-X platform through a gateway, and Data Marker ID requested;
2. Marker ID DB creates Data Marker ID, and correlates data to source with unique Data Source ID (every data sources as a data source identifier);
3. Data Source ID is also added to Admin Rules engine, to ensure the data source has correct attributes for later accurate/compliant access management (IE Internal Data, KYC Data, external client data, etc.); and
4. Marker ID is passed back though to Data Source via gateway to be later passed back to be added to HL.

HL Transactional Block Process

The following is an example of how the HL transactional block process is fulfilled to add data to the hyperledger.
1. Financial Transaction and underlying Data Sources/Marker ID passed to Gateway (Note: If no marker ID presented, and just data—new Marker ID created for new data source);
2. Financial Transaction Marker ID created for Financial transaction, including mapping of Financial Platform transaction ID to Financial Transaction Marker ID;
3. Marker ID, Source ID, and Financial Transaction ID sent to HL Block manger; and
4, All Data IDs and unique HL interface marker added to HL.

Data Access, Search, and Recall Process

The following is an example of how the data is accessed and retrieved, once the data has been added to the hyperledger.
1. User accesses EDT-X via Admin Platform, with data access/recall request;
2. Recall request based on Source ID, Financial Data, and other attributes allowed for user based on approved role (Internal Admin, Regulator, etc.);
3. All Data ID's verified via Data Marker ID DB, and request passed to HL Blockmanager;
4. Marker ID's validated as accurate on HL, and validation passed back to Data Marker DB;
5. Access of real underlying Data from Data Source and Financial Platform passed via Gateway; and
6. Gateway captures data and presents full data elements to user via Admin platform.

The following are some examples of the data elements that may be referenced by marker data in a hyperledger. These data elements may be recorded, embedded, and tagged (to be later referenced/correlated) using marker data:

Transacting Parties Identity (Sender and/or Received)
    Government Issued Identity Credentials
    Business Information (EIN, Federal or State ID, unique platform ID)
    Other non-governmental credentials
Source of Funds Data (Business Operations, Individual Funds, etc.)
Transactional Reconciliation Data
    Settlement Related (underlying transactions/batch data)
    Other sub-platform transaction data
Business Focused Data
    Invoices, contracts, and other transaction related business agreements
    Secondary Business information (if applicable, when multiple businesses and/sub-contractors involved)
Security and Related Fraud Scoring Data
    Fraud Screening, and assurance scores
    Vendo, Score, Assurance Level
    Unique TBOL specific Assurance Level
Transacting Party Blockchain Specific Data
    Wallet Addresses (If Applicable)
HW or transactional origination data
    IP Address
    Device ID
    Other related Device/Admin/User specific Data.
Transactional History (if applicable, and multiple related transactions)
    Other related transactions
    Time Stamp (current, and other transactions)
Transacting Party Relevant Data (Notes—Customer Service, or Compliance Tagged)
    Last known transactions from both or either party
    Other free form information for records/file.

Figure 3:
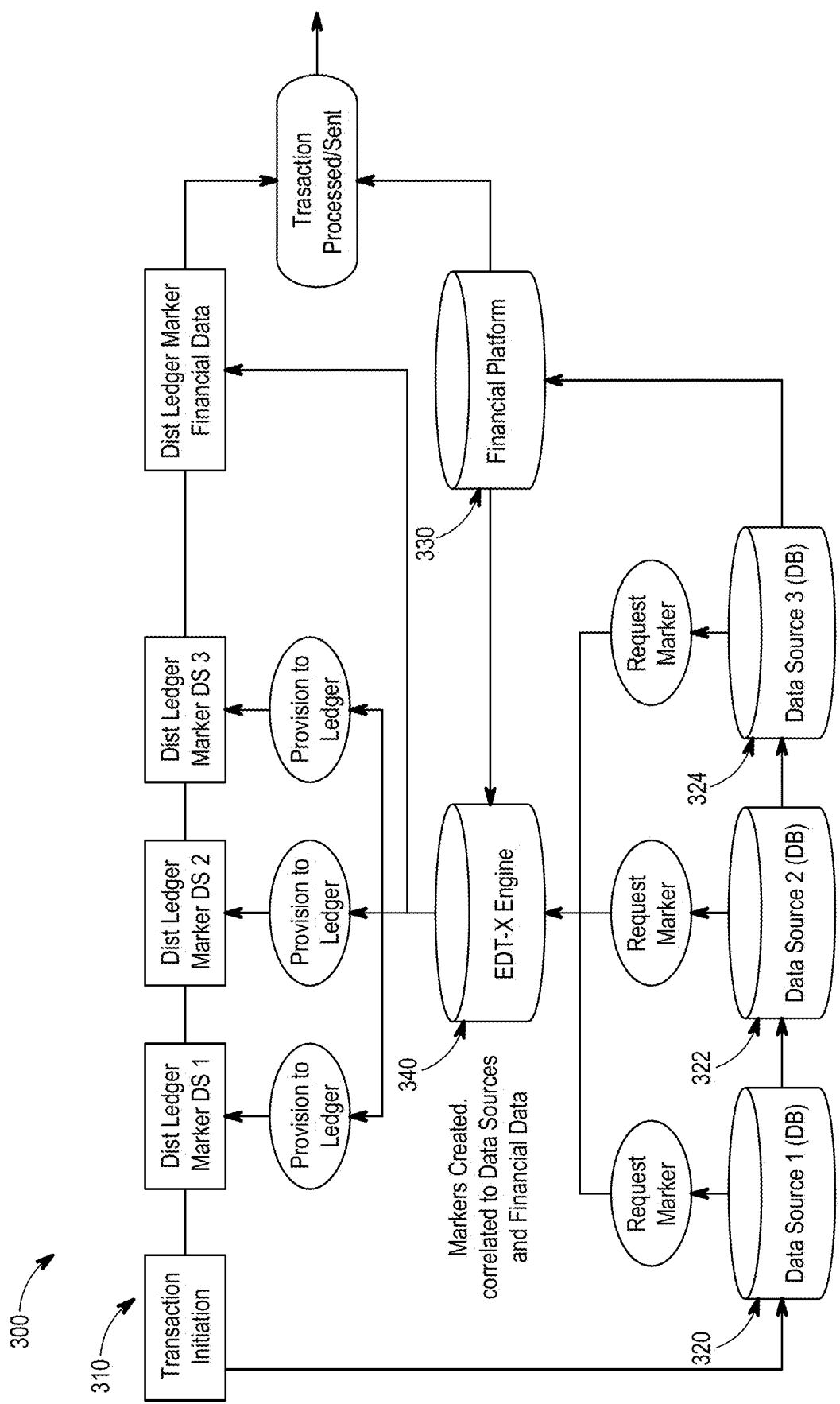
FIG. 3 shows a logic diagram of an example process flow for how multiple data sources may be processed by an EDT-X engine and also a typical data platform, like a financial platform, according to some embodiments.

Referring to FIG. 3, logic diagram 300 shows an example process flow for how multiple data sources may be processed by an EDT-X engine and also a typical data platform, like a financial platform, according to some embodiments. This example logic diagram shows how the EDT-X may be integrated with normal financial databases. In this example, a transaction is initiated 310, and that is tied to three data sources 320, 322, and 324 related to the transaction. Each data source may provide different information about the transaction, such that reviewing all three data sources combined may allow for a sufficient understanding of what kind of transaction occurred and what are the details. Each data source may be associated with a different entity, such as a buyer, and seller, and a broker. The EDT-X engine may generate unique marker data for each data source, where the marker data uniquely points to their respective data source. The three data sources may be stored in the financial platform 330, where the contents may be stored securely, but no contextual information about what the data means will need to be stored. Instead, the marker data that may be used to identify the contents or the meaning of the data sources will be stored in a hyperledger using the EDT-X engine 340. This will permanently record the means for looking up the data sources, but since the data sources are stored in a secure fashion and in a private manner, the actual contents of the transaction would not be available for viewing without the marker data. When the data sources are anonymously recorded by the financial platform and the associated marker data are recorded in the hyperledger, a signal may be transmitted that the recordation of the transaction is now complete.

Figure 4:
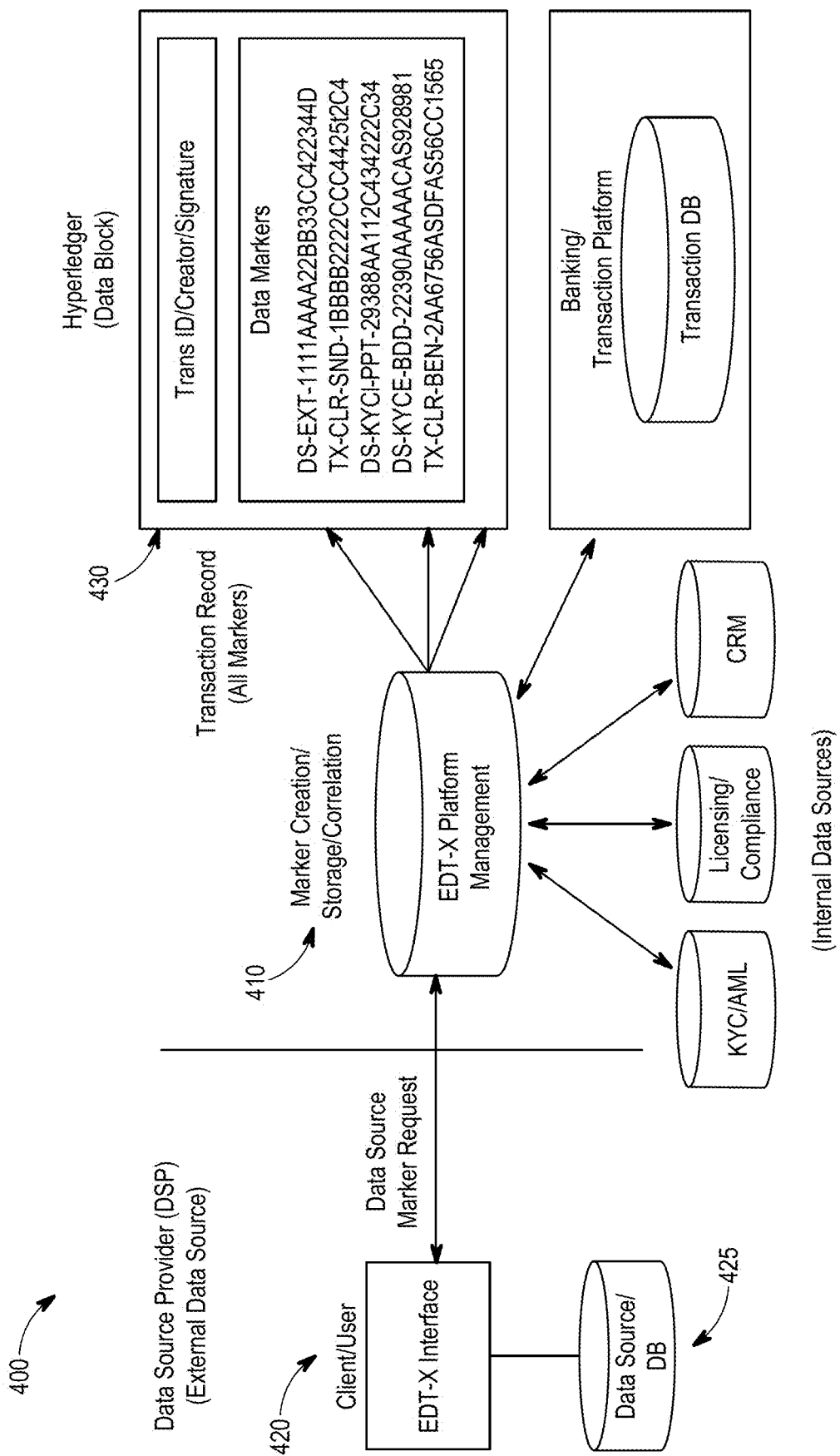
FIG. 4 shows an example of more details about the unique data markers and their use and context within the system involving the ED-X platform, according to some embodiments.

Illustration 400 of FIG. 4 shows an example of more details about the unique data markers and their use and context within the system involving the ED-X platform, according to some embodiments. Similar to the diagram in FIG. 1, a user may interact with the EDT-X platform 410 through an interface, such as the user EDT-X interface 420. Data pertinent to the user may be stored local to the user in a database 425, for example. The EDT-X platform may manage the secure storage of various types of data, such as KYC/AML data, licensing/compliance data, and CRM data, as well as other types of metadata not shown. The data may be permanently stored in a hyperledger 430 and tagged or associated with a unique data marker that includes information on how to find the desired data for retrieval and auditing purposes. The content of the data may be provided to the EDT-X platform 410, while the data markers may be generated by the EDT-X platform 410. The EDT-X platform 410 may package the data, along with the associate data marker (s) and other metadata to be stored permanently in the hyperledger 430.

Figure 5:
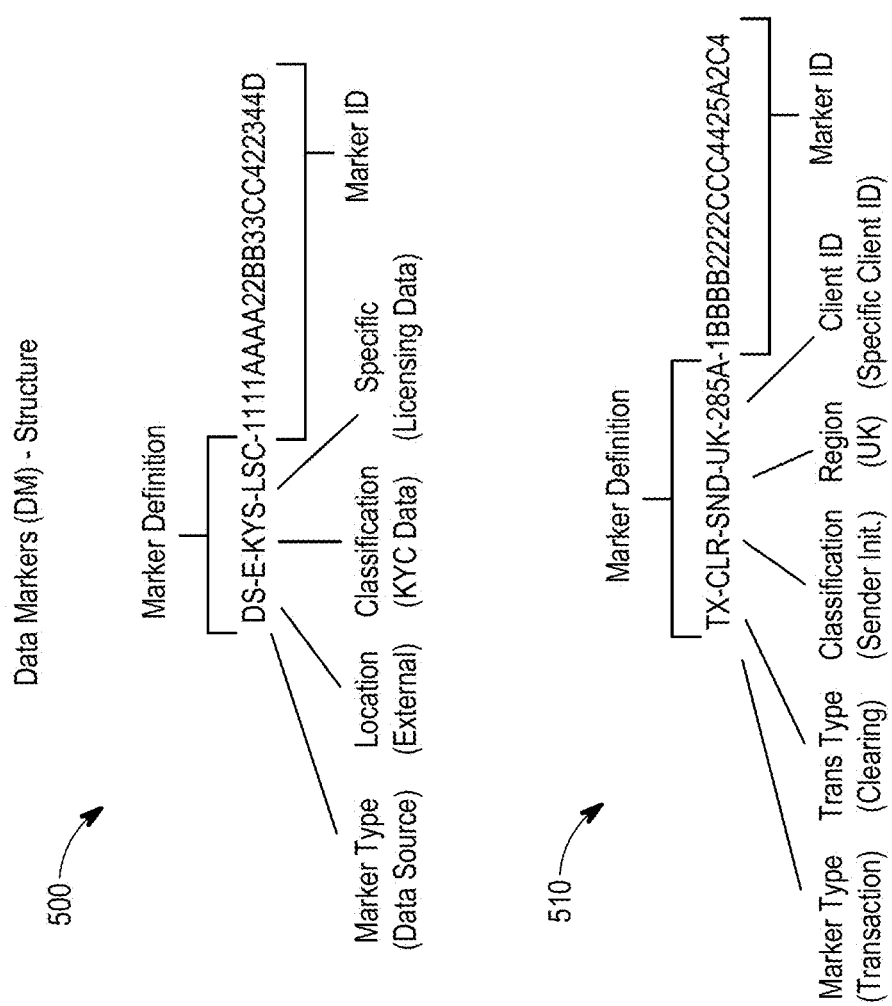
FIG. 5 shows a couple examples of the data structure of a data marker (DM), according to some embodiments.

FIG. 5 shows a couple examples of the data structure of a data marker (DM), according to some embodiments. In general, Data Markers (DM) may be comprised of two sub sections:

Marker Definition: integrates all key definition elements, classifications, and categorization of the DM, for rapid tagging reference w/o revealing crucial data. The marker definition fields may be primary meta tags for the data element, for searching of the hyperledger (HL).

Marker ID: The unique DM ID/alpha numeric file number assigned to the marker. The Marker Definitions can include, but are not limited to: Marker Type (Data Source, Transaction, etc.);

Data Source Location (Internal, External);

Data Source Type (KYC Data, CRM Data, Business Operational/Invoice Data, Compliance Data, Licensing, etc.);

Transaction Type (Clearing, Card Clearing, Remittance, etc.); and

Risk Scores/Fraud Screening Data (e.g.: RS89 can be a risk score of 89 out of 100 from our fraud scoring system, etc.).

Marker ID data may be generated and assigned, just as an account number would be, and may or may not include other reference and data elements for organization. However Marker ID may not typically be used as being the data actively searched to capture/review data types on the ledger.

Examples 500 and 510 show different values for the marker definition and marker ID fields. The size of the information may vary, as shown, and the fields may represent different designations, as shown.

Figure 6:
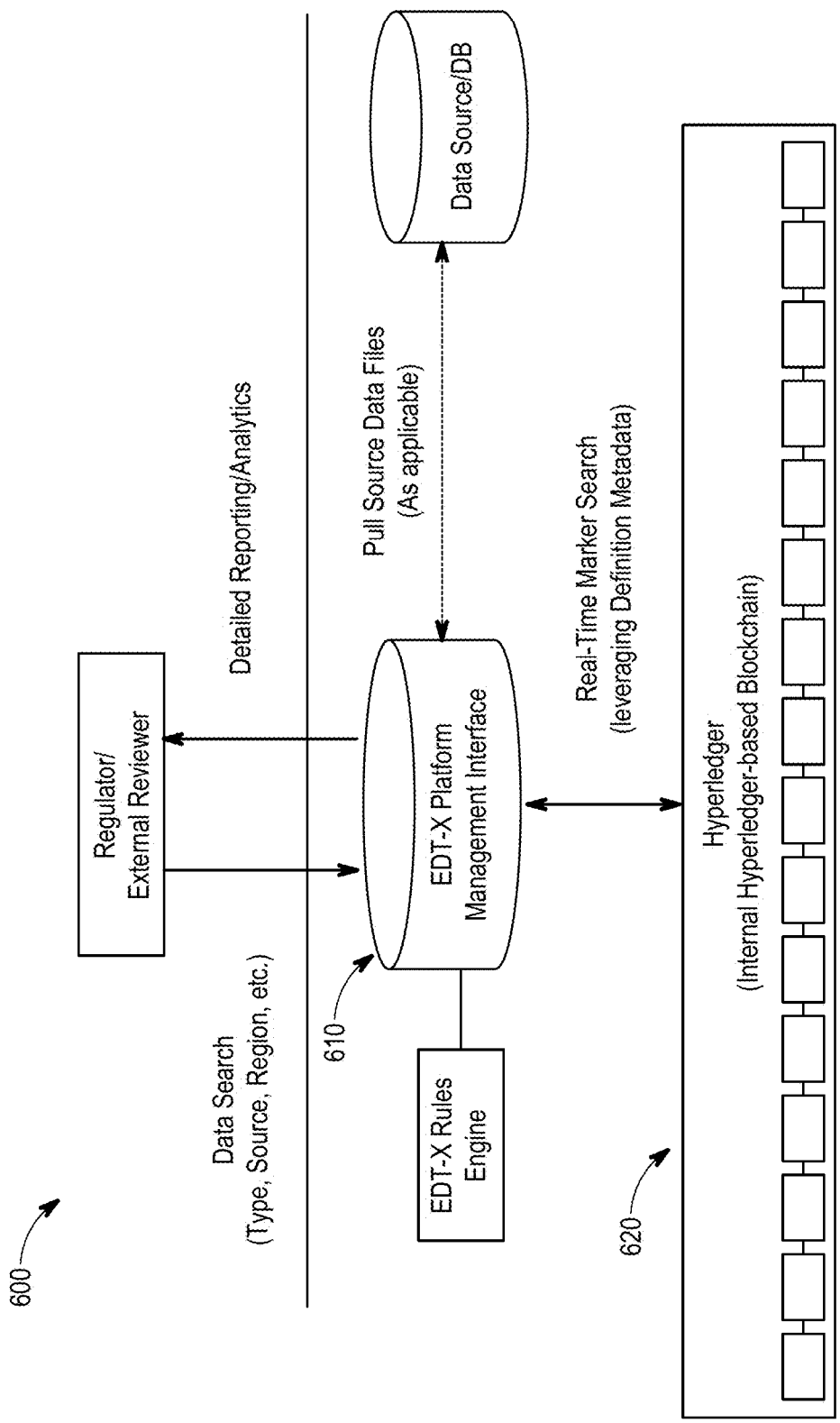
FIG. 6 provides an example of how a regulator or external review of data stored by the EDT-X platform may audit the data, according to some embodiments.

Illustration 600 in FIG. 6 provides an example of how a regulator or external review of data stored by the EDT-X platform may audit the data. In general, all DM's can be rapidly and proactively scanned across the hyperledger, by both internal and external reviews. By utilizing the Marker Definition tags, all data can be rapidly captured and any patterns and sources may be seen for further review. In this example, a regulator/reviewer may input a search query to the EDT-X platform 610. The EDT-X platform 610 may respond to the query by finding DMs in the hyperledger 620 that have at least some field or portion in the marker definition that matches the query. The ETD-X platform 610 may also provide tables or charts or other organized visuals to allow a viewer to see the entries in the aggregate, to help provide access to create patterns and more easily find anomalies.

At the same time, the information may not be alterable or forged, having been already placed in the hyperledger 620. That is, the HL immutability of the signed transactions ensures the permanence of the data string and events for regulators, while ensuring only metadata may be seen near term unless needed to be captured from data sources.

In this way, the EDT-X platform 610 may ensure real time visibility and monitoring internally and externally, without the exposure of critical data unnecessarily. This can allow the EDT-X engine to become a real time, global transactional compliance clearing house.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 622 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 602 or a group of processors 602) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 608) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining." "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The present disclosure is illustrative and not limiting. Further modifications will be apparent to one skilled in the art in light of this disclosure and are intended to fall within the scope of the appended claims.

What is claimed is:

1. An embedded Data Transaction Exchange (EDT-X) engine that, when executed by a processor, is configured to: receive transaction data from a user through the user interface;
generate marker data to be associated with the received data, wherein the generated marker data comprises:
a marker definition portion comprising a publicly visible meta tag associated with the transaction data, wherein the meta tag is searchable to allow the marker data to be retrieved within a block chain distributed ledger without revealing the transaction data;
a marker ID portion comprising a unique alpha numeric file number assigned to the generated marker data, wherein the marker ID portion comprises non-searchable information that routes the marker data to the transaction data, and
a unique reference to the received transaction data; and
store the marker data along with the received data in the block chain distributed ledger such that the marker data and the received data cannot be altered once stored in the block chain distributed ledger, wherein the received data is stored secretly such that only authorized users may be able to view the received data in the block chain distributed ledger, while the marker definition portion of the marker data may be viewed publicly.

2. The EDT-X engine of claim 1, wherein, when executed by the processor, the EDT-X engine is further configured to:
decode the marker data off of the block chain distributed ledger, and wherein the decoded marker data indicates what information anonymously stored in a data marker identification database belongs to a record being audited.

3. The EDT-X engine of claim 2, wherein the publicly visible meta tag of the marker definition portion enables real-time visibility and the marker ID portion collectively enables monitoring of the transaction, without exposing the transaction data.

4. The EDT-X engine of claim 1, wherein the marker definition portion further comprises:
a first data field for a marker type representing a type of data source;
a second data field for a location from where the transaction data was entered into the block chain distributed ledger; and
a third data field for a classification representing what type of subject matter does the transaction data pertain to.

5. The EDT-X engine of claim 4, wherein the marker definition portion further comprises a fourth data field for licensing data associated with the received data.

6. The EDT-X engine of claim 1, wherein, when executed by the processor, the EDT-X engine is further configured to:
subdivide the transaction data into a plurality of data portions, each delineated by a different data source from where each data portion of the plurality of data portions originated from;
for each of the plurality of data portions:
generate a unique data marker; and
store the data portion and associated unique data marker in the block chain distributed ledger separately from the other data portions and associated unique data markers;
wherein an audit of a combination of all of the plurality of data portions is necessary to review a single financial transaction.

7. The EDT-X engine of claim 1, wherein the block chain distributed ledger comprises a hyperledger.

8. A computer-implemented method for storing marker data that references content about a transaction in a block chain distributed ledger, the method comprising:
- receiving, via a processor, transaction data from a user through the user interface;
- generating, via the processor, marker data to be associated with the received data, wherein the generated marker data comprises:
  - a marker definition portion comprising a publicly visible meta tag associated with the transaction data, wherein the meta tag is searchable to allow the marker data to be retrieved within the block chain distributed ledger without revealing the transaction data;
  - a marker ID portion comprising a unique alpha numeric file number assigned to the generated marker data, wherein the marker ID portion comprises non-searchable information that routes the marker data to the transaction data, and
  - a unique reference to the received transaction data; and
- storing, via the processor, the marker data along with the received data in the block chain distributed ledger such that the marker data and the received data cannot be altered once stored in the block chain distributed ledger, wherein the received data is stored secretly such that only authorized users may be able to view the received data in the block chain distributed ledger, while the marker definition portion of the marker data may be viewed publicly.

9. The computer-implemented method of claim 8, further comprising:
- decoding, via the processor, the marker data off of the block chain distributed ledger, and wherein the decoded marker data indicates what information anonymously stored in a data marker identification database belongs to a record being audited.

10. The computer-implemented method of claim 9, wherein the publicly visible meta tag of the marker definition portion enables real-time visibility and the marker ID portion collectively enables monitoring of the transaction, without exposing the transaction data.

11. The computer-implemented method of claim 8, further comprising:
- identifying, via the processor, the marker data based on the publicly visible meta tag.

12. The computer-implemented method of claim 8, wherein the marker data comprises a marker definition portion and a marker ID portion, wherein the marker definition portion comprises information that is searchable to allow the marker data to be retrieved within the block chain distributed ledger, and the marker ID comprises non-searchable information that was provided by a user through a user interface.

13. The computer-implemented method of claim 12, wherein the marker definition portion comprises:
- a first data field for a marker type representing a type of data source;
- a second data field for a location from where the received data was entered into the block chain distributed ledger; and
- a third data field for a classification representing what type of subject matter does the received data pertain to.

14. The computer-implemented method of claim 13, wherein the marker definition portion further comprises a fourth data field for licensing data associated with the received data.

15. The computer-implemented method of claim 8, wherein the block chain distributed ledger comprises a hyperledger.

16. A computer-implemented method of auditing a transaction of interest, the method comprising:
- confirming, via a Data Transaction Exchange (EDT-X) platform, a regulatory authority of an auditor;
- initiating a query, via a user interface of the EDT-X platform, associated with the transaction of interest, wherein the query comprises a user input from the auditor;
- scanning, via an engine of the EDT-X platform, a plurality of data markers for data associated with the user input, wherein each data marker of the plurality of data markers comprises a meta tag associated with immutable, permanently stored transaction data, and wherein the meta tag is searchable without revealing the transaction data;
- correlating, via the engine of the EDT-X platform, the user input to at least one meta tag of at least one data marker of the plurality of data markers.

17. The computer-implemented method of claim 16, further comprising:
- confirming, via a rules engine of the EDT-X platform, that an auditor complies with an access rule stored in the rules engine of the EDT-X platform.

18. The computer-implemented method of claim 16, further comprising:
- confirming, via a rules engine of the EDT-X platform, that a data source of the transaction data complies with a rule stored in the rules engine of the EDT-X platform.

19. The computer-implemented method of claim 16, further comprising:
- filtering, via the EDT-X platform, the transaction data to ensure compliance based on a rule stored in a rules engine of the EDT-X platform.

* * * * *